Figure 1:
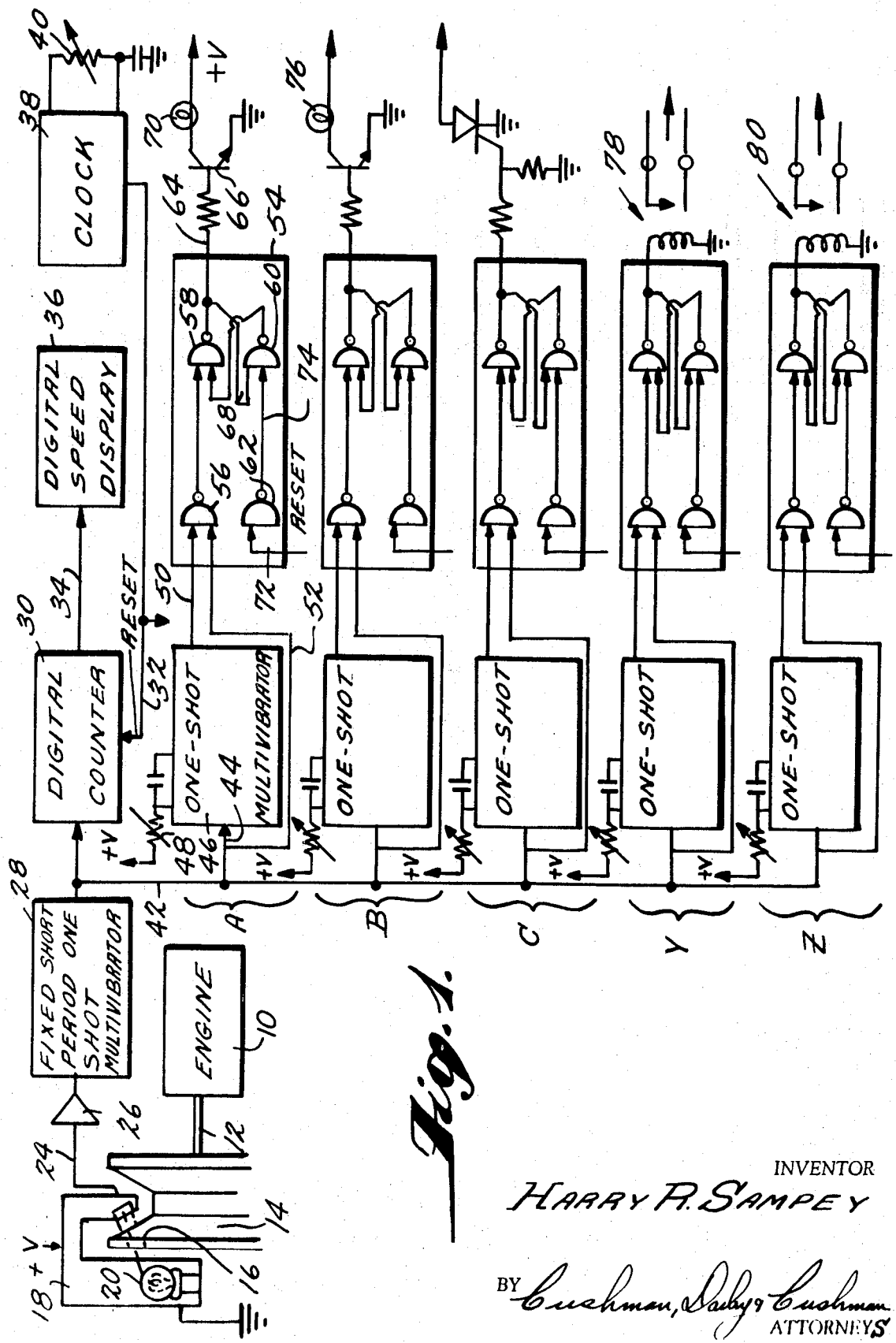

United States Patent
Sampey

[11] 3,719,888
[45] March 6, 1973

[54] PREDETERMINED SPEED DETECTOR FOR DIGITAL TACHOMETER

[75] Inventor: Harry R. Sampey, Vanderbilt, Pa.

[73] Assignee: Pentron Industries, Inc., Cleveland, Ohio

[22] Filed: May 26, 1971

[21] Appl. No.: 147,148

[52] U.S. Cl. .................................324/161, 324/166
[51] Int. Cl. ..........G01p 3/56, G01p 3/48, G01p 3/54
[58] Field of Search......324/161, 166, 168, 169, 170, 324/173, 174, 175

[56] References Cited

UNITED STATES PATENTS

| | | | |
|---|---|---|---|
| 3,153,746 | 10/1964 | Atkinson | 324/169 X |
| 3,560,854 | 2/1971 | Moss et al. | 324/161 X |
| 3,559,063 | 1/1971 | Galletti | 324/169 |

OTHER PUBLICATIONS

Goodwin; Electronics; Apr. 10, 1959, pp. 58-61

Primary Examiner—Alfred E. Smith
Attorney—Cushman, Darby & Cushman

[57] ABSTRACT

An improved predetermined speed detector for use in a digital tachometer where signal pulses proportional in repetition rate to engine speed or RPM are available. The signal pulses are used to trigger a monostable multivibrator such that the duty cycle of the monostable output is a function of the signal pulse repetition rate (hence RPM) and the characteristic period of the monostable circuit. The time coincidence of the input signal pulses and the monostable output is then detected to obtain an indication of a predetermined duty cycle and hence engine RPM for any given characteristic monostable time period. Thus by merely detecting the time coincidence of these two signals with a latched AND gate (such as an RS flip-flop or equivalent) engine shift indicators, excessive speed indicators (i.e., horns, flashing lights, etc.) and/or engine disabling devices may be conveniently actuated.

12 Claims, 3 Drawing Figures

INVENTOR
HARRY R. SAMPEY

PREDETERMINED SPEED DETECTOR FOR DIGITAL TACHOMETER

This invention generally relates to digital tachometer circuits for use in an engine driven vehicle. More specifically, the invention relates to an improved predetermined speed detector for use in such a digital tachometer where electrical signal pulses having a repetition rate proportional to the engine speed or RPM are available. In effect, the detector of this invention is a digital frequency filter.

Digital tachometers, per se, for engine driven vehicles are known in the prior art as evidenced, for instance, by U.S. Pat. No. 3,525,044. Such digital tachometers utilize signal pulses occurring at a repetition rate or frequency proportional to engine speed or RPM by counting such signal pulses for a predetermined time period to obtain a digital display representing the engine's speed or RPM.

While the digital display of the instantaneous engine speed (i.e. substantially instantaneous since the update cycle for the digital counter and display aparatus is usually relatively brief) is useful, it is often necessary or at least advantageous to actuate particular utilizing devices whenever certain predetermined engine speeds occur. Of course, since the gearing ratio between engine speed and wheel speed is generally known and fixed (at least in the highest gearing ratio) and since the tire diameter for a given vehicle is easily ascertainable, the predetermined engine speeds at which certain utilizing devices are preferably actuated may also be made to occur at particular vehicle velocities.

For instance, the engine of a race car or that of a truck can be greatly damaged if the engine RPM is permitted to exceed specified safe operating limits at a particular gear ratio. Accordingly, it is advantageous for an operator of such a vehicle to obtain an exact indication of the time at which an optimum shift from one gear ratio to another gear ratio may be made based on detecting a predetermined engine speed or RPM. Additionally, to help the operator anticipate such a shift, a pre-shift indicator may also be provided at a sufficient earlier predetermined engine speed to provide the operator with enough time to prepare for the oncoming optimum shift point which will later be indicated by the actual shift point indicator.

Further, there are various proposals now being made to amend the laws of our country such that motor vehicles will have certain maximum speeds and/or shall emit certain warning signals within predetermined speed ranges. For instance, as the vehicle velocity passes 85 miles per hour, a horn circuit is to be activated such that if the vehicle continues to travel at such excessive speeds, the horn will sound as a warning to other motorists. In addition, should the vehicle velocity increase past 95 miles per hour the emergency flasher lights of an automobile could be activated in addition to the horn circuit. Finally, to prevent the automobile from exceeding a certain speed such as 95 miles per hour, the vehicle engine can be effectively disabled by detecting such speeds and disabling the ignition coil and/or altering the throttle linkage or both.

One or more of the novel predetermined speed detector of this invention may be utilized with such a digital tachometer to detect predetermined engine speeds and/or vehicle speeds and to actuate appropriate utilizing circuits in response thereto according to needs such as those previously described.

The predetermined speed detector of this invention utilizes a one-shot multivibrator as well as a coincidence detector to selectively actuate a utilizing circuit whenever a predetermined engine speed and/or vehicle velocity is exceeded. Briefly, the available signal pulses proportional in repetition rate to the engine speed are input both to the trigger circuit of the one-shot multivibrator and to the coincidence detector. Another input of the coincidence detector is connected with the one-shot multivibrator output.

The characteristic period of the one-shot multivibrator is then adjusted such that there is time coincidence between the one-shot multivibrator output (when caused by a particular trigger repetition rate) and the next succeeding signal pulse. Whenever such a time coincidence between the output of the one-shot multivibrator and the input signal pulses is detected by the coincidence detector, a flip-flop circuit is set to selectively actuate a particular desired utilizing circuit as should now be apparent. The coincidence detector may be externally reset or it may be automatically reset by the output of the one-shot multivibrator as will be more apparent from the detailed discussion below. As a practical matter, the input signal pulses are usually chosen to be of such small time duration that the coincidence detector and flip-flop are actuated only when the duty cycle of the output of the one-shot multivibrator substantially approaches 100 percent.

As previously pointed out, by varying the period for which the signal pulses are counted in the digital tachometer, the displayed count may be caused to represent the vehicle velocity rather than engine RPM (taking into account transmission ratios and tire diameters as should be apparent). Accordingly, the clock of the digital tachometer of this invention (which clock determines such counting periods) may be adjusted to cause the counting period to correspond to a digital display of vehicle velocity rather than engine speed or RPM. Of course, a single clock or oscillator circuit may be caused to oscillate at different frequencies to achieve this desired result or, alternatively, several different clock circuits could be utilized with the output from only one being selectively used at any given time to obtain a digital count in the display apparatus of the tachometer representative of vehicle velocity for particular gear ratios, etc. as should now be apparent.

Figure 2:
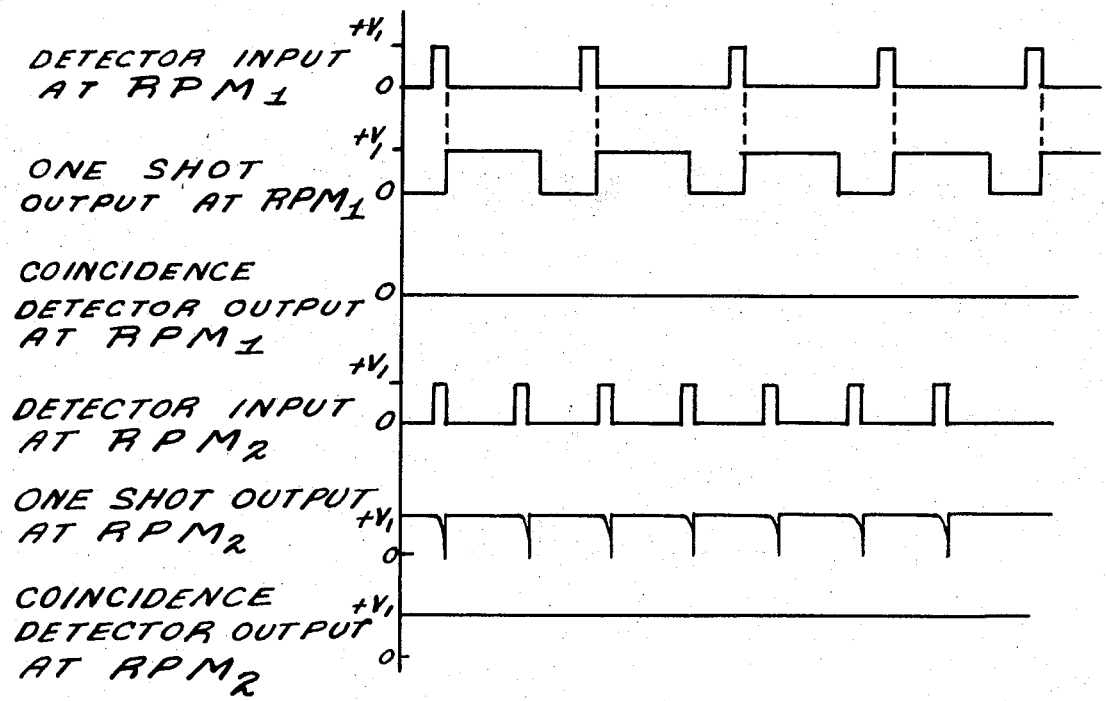
Figure 3:
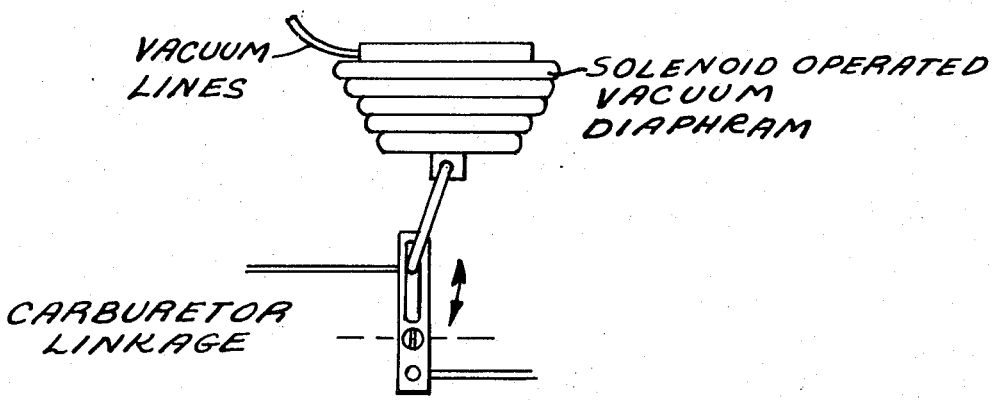

Other objects and advantages of this invention as well as a more complete understanding will be apparent from the following detailed description of a preferred exemplary embodiment and the accompanying drawings, of which:

FIG. 1 is a schematic diagram of a digital tachometer and several predetermined speed detectors in an exemplary embodiment of this invention, FIG. 2 is a graph showing various wave forms for help in explaining the operation of the detector circuits shown in FIG. 1, FIG. 3 is a pictorial diagram of an electromechanical utilizing circuit for controlling vehicle speed and/or engine RPM with a predetermined speed detector according to this invention.

Referring to FIG. 1, an engine 10 is shown which provides the motive power for a vehicle. The engine 10 shown in FIG. 1 might be a gasoline or diesel engine; however, the digital tachometer and predetermined speed detector of this invention are equally useful for any other type of engine such as an electric motor, etc.

A driven shaft 12 of the engine 10 turns a pulley or sheave 14 which has at least one aperture 16 formed therein to permit the passage of light therethrough. A signal source 18 is arranged to house a light source 20 and a photo responsive transistor 22 on opposite sides of at least a portion of the revolving pulley 14 such that at least once during every revolution, the light passes through aperture 16 from the light source 20 onto the photo transistor or detector 22, and an output pulse is delivered along line 24. Of course, those skilled in the art will readily appreciate that other equivalent forms of signal generators might be used such as for instance magnetic sensors or those involving light reflection rather than light passage, etc. Additionally, while the preferred exemplary embodiment utilizes one pulse per revolution of the engine 10, (a plurality of pulses per revolution of the engine might also be generated with a similar effect provided that the circuitry for analyzing these pulses properly takes into account the actual number of pulses per revolution of the engine 10. The light source 20 and photo transistor or detector 22 are powered from the voltage V as shown in FIG. 1.

Since the pulses on line 24 from signal source 18 will probably be relatively weak and of nonuniform dimensions, they are amplified by amplifier 26 and shaped into uniform pulses of fixed duration by the one-shot multivibrator 28 which is triggered by the output of amplifier 26. Preferably, in the preferred exemplary embodiment, amplifier 26 may comprise a conventional common emittor transistor amplifier to provide both amplification and impedance isolation as will be apparent to those in the art. In addition, between the amplifier 26 and the one-shot multivibrator 28, additional pulse shaping may be obtained by utilizing a Schmidt trigger circuit of conventional design as should again be apparent to those in the art.

The output from one-shot multivibrator 28 represents a string of uniform electrical pulses having a repetition rate proportional to the rotational speed or velocity of engine 10. In other words, the number of such uniform pulses occurring within a predetermined fixed time period is proportional to the instantaneous engine speed. By choosing a predetermined fixed counting period appropriately, the number of counted pulses in any given counting period may be conveniently related to the instantaneous engine speed by a factor of 10 or 100, etc. such that a substantially direct readout of the counter contents will provide a direct indication of the engine speed. For instance, if one pulse occurs for each revolution of the engine 10, then a predetermined fixed counting period of 0.6 seconds will result in a total count equal to the actual engine RPM divided by 100.

That is, the pulses from one-shot multivibrator 28 are input to a conventional digital counter 30 which counts them until being reset by signal over line 32. Just prior to being reset by such a reset signal on line 32, the contents of the digital counter 30 are output over line 34 to digital display unit 36 (which may include temporary storage means for storing the just previous contents of the digital counter etc. as should be apparent to those in the art) where a visual display of the just previous counter contents is given.

Accordingly, when the apparatus of FIG. 1 is operated as a tachometer for the engine 10, a clock 38 generating reset pulses over line 32 is adjusted to provide such reset pulses at intervals of 0.6 seconds (assuming one signal pulse per revolution of engine 10). If the apparatus of FIG. 1 were to be utilized as a vehicle velocity indicator instead, then the interval between reset pulses on line 32 must be adjusted appropriately to take into account gear ratios and tire diameters as should be apparent to those in the art. This adjustment of the reset pulses or, in effect, the fixed predetermined counting period for counter 30, may be obtained by adjusting the frequency of clock 38 as, for instance, by variable resistor 40.

This can be easily accomplished from the simple equation:

$$k = (d\pi/8)\, 0.6818$$

$k$ = Gate time period in seconds
$d$ = Diameter of tire

Of course, rather than a continuously variable (presumably calibrated adjustment 40, preset frequency determining circuits could be selectively switched into operation for various gear ratios and/or tire diameters. Alternatively, several different clocks 38 could be adjusted or preset to particular desired frequencies corresponding to certain predetermined gear ratios and/or tire diameters with the outputs from the various individual clock means being selectively switched or gated to the digital counter 30 as should be apparent to those in the art. In addition, the pulse for transferring information from digital counter 30 to the storage and/or display unit 36 may also be obtained from the reset pulse. For instance, the leading positive going edge of a reset pulse might be differentiated to obtain a strobe pulse for effecting transfer of the information from a digital counter 30 to the storage and/or display unit 36 while the trailing negative going edge of the reset pulse will effect the actual reset of the digital counter 30 as should be apparent to those in the art.

A plurality of individual predetermined speed detectors A, B, C ... Y, Z are also shown in FIG. 1 and being connected to the source of electrical signal pulses having repetition rate proportional to the engine speed or RPM. All of these circuits operate in the same fashion except that the individual circuits are each preset to respond at a different detected engine/vehicle speeds to result in selective actuation of particular utilizing circuits at different desired engine and/or vehicle speeds. Accordingly, a detailed explanation will be given for the detector's operation only with respect to detector A shown in FIG. 1 and for which various explanatory wave forms are depicted in FIG. 2.

The input to the detector A over line 42 at a low speed, say $RPM_1$, is shown as a series of uniform pulses having a repetition rate corresponding to the relatively low $RPM_1$. These pulses are input over line 44 to a one-shot multivibrator 46 having a characteristic period determined by resistor 48 as should be apparent to those in the art. The output from the one-shot multivibrator 46 on line 50 is also shown in FIG. 2. As can be seen, there is no time coincidence between the output of the one-shot on line 50 and the input pulses themselves which are presented on line 52 to a coincidence detector 54.

Coincidence detector 54 comprises an $\overline{RS}$ flip-flop which will now be described. NAND gates 56, 58, 60 and 62 all operate in the conventional fashion. That is, if any of the inputs to these NAND gates is low (representing binary 0) then the output from that particular NAND gate will be high (representing the binary digit 1). On the other hand, if all the inputs to a NAND gate are high, then the output from that NAND gate will be low.

Accordingly, so long as both the inputs to NAND gate 56 on lines 50 and 52 are not in time coincidence, either one or the other of the inputs to the NAND gate 56 is always in a low state (representing binary digit 0). Thus, in this condition of non-coincidence, the output from NAND gate 56 will always be high. Assuming that the coincidence detector 54 has been previously reset, the output from NAND gate 60 will also be high such that both inputs to NAND gate 58 being high, the output on line 64 will be low thus maintaining transistor 66 in an "off" condition as should be apparent.

However, as the engine speed is increased, the repetition frequency pulses along line 42 and hence at the input 44 of one-shot 46 and at the input 52 of the coincidence detector 54 increase proportionately in repetition rate. Depending upon the characteristic period of the one-shot 46, at some particular predetermined engine speed, there will begin to occur time coincidence between the input and output pulses to one shot 46. Accordingly, by detecting such time coincidence, that particular predetermined engine speed corresponding to the particular predetermined characteristic period of the one shot may be detected and utilized for actuating a utilizing circuit.

Such a condition is shown for a higher engine speed, $RPM_2$, in FIG. 2. Here, the input pulses on line 44 are closer together representing the higher repetition rate corresponding to the higher engine speed. However, the output pulses from one-shot 46 have the same characteristic period as predetermined by resistor 48. Accordingly, there is a time during each input signal pulse on line 52 when there is also concurrently an output from the one-shot multivibrator 50 along line 50. Accordingly, at this instant, both inputs in NAND gate 56 are high thus resulting in a low output from NAND gate 56 and, hence, a low input in NAND gate 58 thereby causing the output of NAND gate 58 to switch to a high output (as well as one input of NAND gate 60 on line 68).

Since the output of NAND gate 60 is thereby switched to a low state (in the absence of any reset signal), the second input to NAND gate 58 is now also made low such that even if the output from NAND gate 56 reverts to a high condition, the output from NAND gate 58 is latched into a high condition thereby switching the transistor 66 to a steady "on" condition to actuate a utilizing device such as a lamp or visual indicator 70. It should be observed that if a reset signal is input on line 72 to NAND gate 62, the output from NAND gate 62 will change from high to low thereby causing the output from NAND gate 60 to change from low to high. Accordingly, the bottom input of NAND gate 58 will then be placed in a high condition such that the next time the output from NAND gate 56 goes high, the coincidence detector 54 will be automatically reset with a low output from NAND gate 58 to turn transistor 66 "off."

If desired, instead of a separate reset signal on line 72 (which may be automatically generated from clock 38 along line 32) the reset signal may be obtained directly from the output along line 50 of one-shot 46 if desired. If this option is exercised, a connection would be made between line 50 (i.e. of one shot multivibrator 46) and the lower input of NAND gate 60 on line 74. (NAND gate 62 is not needed) This is possible since, in a practical sense, the coincidence detector 54 is actually detecting the point at which the output from one-shot multivibrator 46 substantially approaches a 100 percent duty cycle. That is, the input signal pulses are of such a short duration (i.e. approximately one microsecond) that coincidence between the input and the output of one-shot 46 does not occur until the duty cycle of that output is substantially 100 percent. Accordingly, the output from one-shot 46 will be in a high condition continuously shortly after the coincidence detector 54 is first actuated such at this continuous high signal on line 50 can be used as a second input on line 74 to NAND gate 60 if desired. Then, whenever the output on line 50 drops back to a low condition, this would automatically reset the coincidence detector 54 as should now be apparent.

As shown in FIG. 1, detector circuit A is set to indicate a pre-shift engine speed to warn the operator of the engine that an optimum shifting speed is soon to occur. Thereafter, detector circuit B which is preset to detect a slightly higher engine speed indicates occurrence of the actual optimum shift point at shift indicator 76. Accordingly, the operator of the engine 10 may begin preparation for the shift when preshift indicator 70 lights and may then actually complete the shift when the shift indicator 76 subsequently lights. In addition, a detector circuit C may be preset to detect a certain maximum vehicle velocity (corresponding to a maximum engine speed in the highest gear range) thereby triggering an SCR or relay circuit to short the ignition coil of the engine when such excessive speeds are detected thereby automatically limiting the highest obtainable vehicle velocity as should now be apparent. In addition, similar engine and/or vehicle speed control may be obtained by actuating a solenoid operated vacuum diaphragm mechanism as shown in FIG. 3 which effectively adjusts the carburetor linkage to reduce the engine/vehicle speed.

Finally, the utilizing circuits may be warning devices such as are now contemplated for installation on American Motor vehicles. For instance, the detector circuit Y might be present to detect vehicle speed of a first speed such as 85 miles per hour at which time the vehicle horn circuit would be actuated via relay 78 to warn approaching motorists of the vehicle's excessive speed. In addition, a further detector circuit Z may be present to detect an even higher speed such as 95 miles per hour and to actuate the vehicle's emergency light flashing circuit via relay 80 as should now be apparent.

While only a few exemplary embodiments of this invention have been described in detail, those in the art will readily appreciate that many obvious modifications may be made in the disclosed exemplary embodiments without materially affecting the desired results and/or operation of the apparatus. Accordingly, all such modifications are intended to be included within the scope of this invention.

What is claimed is:

1. In combination with a digital tachometer comprising means for generating electrical signal pulses at a repetition rate proportional to an engine's speed or RPM and means for digitally counting and displaying the interval to provide a digital indication of engine speed or RPM, an improved predetermined speed detector comprising:
   a monostable multivibrator means which, when triggered from a first state to a second state returns to the first state after a characteristic time period, said monostable multivibrator being connected for triggering by said electrical signal pulses whereby the duty cycle of an output signal produced when said second state exists is dependent upon the repetition rate of said electrical signal pulses and upon the characteristic time period of said monostable multivibrator means,
   coincidence detecting means having first and second inputs connected to receive both said electrical signal pulses and said output signal from said nonostable multivibrator means respectively for producing a speed signal in response to the simultaneous occurrence of signals on said first and second inputs whereby the occurrence of said speed signal is a function of the duty cycle of said output signal and thereby representative of a predetermined engine speed or RPM for a given characteristic period of said monostable multivibrator means; and
   means for selectively altering the duration of digital counting to cause the resulting digital display to directly represent vehicle velocity rather than engine speed or RPM when such selection is effected.

2. A combination as in claim 1 further comprising: period control means for presetting said characteristic period of said monostable multivibrator means to a particular value characteristic of a desired predetermined engine speed or RPM.

3. A combination as in claim 1 further comprising: indicator means connected to said coincidence detecting means for indicating the occurrence of said speed signal.

4. A combination as in claim 3 wherein said indicator means comprise a visual indicator means for visually indicating an optimum shifting time to an operator of the engine.

5. A combination including a plurality of monostable multivibrator means, of coincidence detecting means and of indicator means as described in claim 3 wherein different ones of the monostable multivibrator means have a different characteristic period whereby a plurality of different predetermined engine speeds are indicated.

6. A combination as in claim 5 wherein said plurality of indicator means comprise visual indicator means for visually indicating engine speeds related to at least one optimum shift point for the engine.

7. A combination as in claim 6 wherein a first visual indicator means indicates a pre-shift engine speed and a second visual indicator means indicates an optimum engine speed for the actual shifting operation.

8. A combination as in claim 3 wherein said indicator means comprises an automobile horn.

9. A combination as in claim 3 wherein said indicator means comprises an emergency light flashing system in an automobile associated with the engine.

10. A combination as in claim 1 further comprising: engine disabling means connected to said coincidence detecting means for preventing engine speeds above said predetermined speed in response to said speed signal.

11. A combination as in claim 10 wherein said engine disabling means comprises an electrically triggered switch means connected to an ignition coil associated with said engine for effectively disabling said ignition coil in response to said speed signal.

12. Apparatus for selectively computing and displaying either engine RPM or vehicle velocity, said apparatus comprising:
   signal source means for generating electrical signal pulses having a repetition rate proportional to said engine RPM,
   counting means for digitally counting said signal pulses during predetermined time intervals,
   display means for visually displaying the contents of said counting means after said predetermined time intervals, and
   control means for selectively causing said predetermined time interval to have a first preset value corresponding to direct display of engine RPM on said display means and a second preset value corresponding to direct display of vehicle velocity on said display means,
   said first preset value being chosen with consideration for the number of signal pulses occurring for each engine revolution and said second preset value being chosen with added consideration for vehicle tire diameter and gear ratios intervening between said engine and vehicle tire.

* * * * *